US011615203B2

(12) United States Patent
Rickard et al.

(10) Patent No.: US 11,615,203 B2
(45) Date of Patent: Mar. 28, 2023

(54) REPRESENTING ACCESS PERMISSIONS TO DOCUMENTS

(71) Applicant: salesforce.com, inc., San Francisco, CA (US)

(72) Inventors: Scott Rickard, Bellevue, WA (US); Anuprit Kale, Oakland, CA (US); Victor Spivak, San Mateo, CA (US); Yanik Grignon, Cedar Park, TX (US); Venkatesan Chandrasekaran, Pleasanton, CA (US)

(73) Assignee: Salesforce, Inc., San Francisco, CA (US)

(*) Notice: Subject to any disclaimer, the term of this patent is extended or adjusted under 35 U.S.C. 154(b) by 141 days.

(21) Appl. No.: 17/242,689

(22) Filed: Apr. 28, 2021

(65) Prior Publication Data

US 2021/0248261 A1 Aug. 12, 2021

Related U.S. Application Data

(62) Division of application No. 16/673,899, filed on Nov. 4, 2019, now Pat. No. 11,080,420, which is a division of application No. 15/441,144, filed on Feb. 23, 2017, now Pat. No. 10,496,844.

(51) Int. Cl.
*G06F 21/62* (2013.01)
*G06F 21/60* (2013.01)

(52) U.S. Cl.
CPC ........ *G06F 21/6227* (2013.01); *G06F 21/604* (2013.01)

(58) Field of Classification Search
CPC .... G06F 21/6227; G06F 21/604; G06F 21/62; G06F 21/606; G06F 21/6209; G06F 21/6218; G06F 21/6245
See application file for complete search history.

(56) References Cited

U.S. PATENT DOCUMENTS

| | | | | |
|---|---|---|---|---|
| 10,798,066 | B2 * | 10/2020 | Chizi | H04L 9/0894 |
| 2005/0108537 | A1 | 5/2005 | Puri et al. | |
| 2007/0156726 | A1 | 7/2007 | Levy | |

(Continued)

OTHER PUBLICATIONS

United States Office Action, U.S. Appl. No. 15/441,144, dated Mar. 22, 2019, seven pages.

*Primary Examiner* — Wilson Lee
(74) *Attorney, Agent, or Firm* — Fenwick & West LLP

(57) ABSTRACT

A record management system stores records for an organization having a plurality of members and a plurality of groups, and manages accessibility of the records for the organization according to a specified record access policy. The record management system generates an accessibility database that indicates, for each member, records that are explicitly or implicitly accessible by each member such that the records accessible for each member can be quickly determined if needed. A member has explicit access to a record if there is an explicit indication of accessibility between the member and the record. A member has implicit access to a record through membership associations to other members or groups that have access to the record. The record management system also receives search queries from members and returns records that are relevant and accessible to the members based on the accessibility database.

20 Claims, 9 Drawing Sheets

(56) References Cited

U.S. PATENT DOCUMENTS

| | | | | |
|---|---|---|---|---|
| 2009/0083240 | A1* | 3/2009 | Nolan | H04L 63/105 |
| 2012/0101985 | A1* | 4/2012 | Kemp | G06F 16/24565 707/E17.005 |
| 2013/0191416 | A1 | 7/2013 | Lee et al. | |
| 2013/0263206 | A1 | 10/2013 | Nefedov et al. | |
| 2014/0025692 | A1* | 1/2014 | Pappas | G06F 16/9535 707/754 |
| 2015/0324454 | A1 | 11/2015 | Roberts et al. | |
| 2016/0196294 | A1 | 7/2016 | Tilekar | |
| 2016/0196336 | A1 | 7/2016 | Allen et al. | |
| 2016/0225271 | A1 | 8/2016 | Robichaud et al. | |
| 2017/0339150 | A1* | 11/2017 | Barsness | G06F 21/6209 |

* cited by examiner

AS *Matrix*

| | M1 | M2 | M3 | G1 |
|---|---|---|---|---|
| R1 | 1 | 0 | 0 | 0 |
| R2 | 0 | 1 | 1 | 0 |
| R3 | 0 | 0 | 0 | 1 |
| R4 | 0 | 0 | 1 | 0 |

*FIG. 4A*

DGM *Matrix*

| | M1 | M2 | M3 | |
|---|---|---|---|---|
| M1 | 1 | 0 | 0 | |
| M2 | 0 | 1 | 0 | $I_u$ |
| M3 | 0 | 0 | 1 | |
| G1 | 0 | 1 | 1 | $D_{gu}$ |

*FIG. 4B*

REPRESENTING ACCESS PERMISSIONS TO DOCUMENTS

CROSS REFERENCES TO RELATED APPLICATION

This application is a divisional of U.S. patent application Ser. No. 16/673,899, filed on Nov. 4, 2019, which is a divisional of U.S. patent application Ser. No. 15/441,144, filed on Feb. 23, 2017, now U.S. Pat. No. 10,496,844, which is incorporated by reference in its entirety into the present application.

FIELD OF ART

The disclosure relates in general to electronic records stored in a database, and more specifically to determining access permissions for electronic records.

DESCRIPTION OF THE RELATED ART

Members of organizations (e.g., businesses, enterprises, and universities) generate and store electronic records on local or remote databases. Often times, members query electronic records for various purposes. For example, members may submit a search query requesting retrieval of records within the organization that contain correspondence to a particular client of the organization. However, a member of an organization typically does not have permission to access every record but rather has permission to access only a subset of the records within the organization. As a result, the organization must manage records such that a member can access records that are accessible to the member while blocking those that are inaccessible to the member. For example, only records that are both relevant and accessible by the member executing a search query should be provided to the member.

A member may have access to records if there is a direct indication of accessibility between the records and the member, or most often times, indirectly through associations with other members or groups that have access to records. For example, certain records may be accessible to a member because the member is a constituent of a group that is granted access to the records. As another example, certain records may be accessible to a member because the member is a constituent of a group that gains access to the records through another member. Despite the complexity of accessibility rules, typically a determination needs to be quickly made as to which records are accessible by a member. For example, when a member submits a query, the member expects to receive search results within a short amount of time.

SUMMARY

A record management system stores records for an organization having a plurality of members and a plurality of groups, and manages accessibility of the records for the organization using an accessibility database. The accessibility database indicates, for each member, records that are accessible by the member either through explicit or implicit permissions.

An individual member has explicit access to a record if there is an explicit indication of accessibility between the member and the record. For example, the record management system may automatically grant explicit access to a record for a member that created the record. A member may have implicit access to a record through membership associations to other members or groups that have explicit access to the record. For example, the record management system may grant implicit access to a member that is part of a group having access to the record.

In one embodiment, the record management system generates the accessibility database by combining an explicit database containing information on which records are explicitly accessible by the plurality of members and the plurality of groups, and a membership database containing membership information indicating associations between members and groups. The membership informations indicates which groups members are a part of and whether certain members or groups have connections to other members or groups from which access to records can be inherited.

The record management system also receives search queries from members and returns records that are relevant to the search queries. In one embodiment, when the record management system receives a search query, the system determines which records to return based on the accessibility database. The search results include records that are accessible by the member associated with the search query.

In one embodiment, the record management system identifies low-visibility members that have access to less than a threshold number of records according to the accessibility database. When a low-visibility member provides a search query, the record management system performs the search query on the records accessible by the member. In another embodiment, the record management system identifies low-visibility records that are accessible by less than a threshold number of members according to the accessibility database. When a member provides a search query, the record management system identifies whether the member has access to any of the low-visibility records. The record management system performs the search query within the high-visibility records as well as the low-visibility records accessible by the member.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG. 4A illustrates an example explicit database AS, in accordance with an embodiment. FIG. 4B illustrates an example membership database DGM, in accordance with an embodiment.

DETAILED DESCRIPTION

Figure 1:
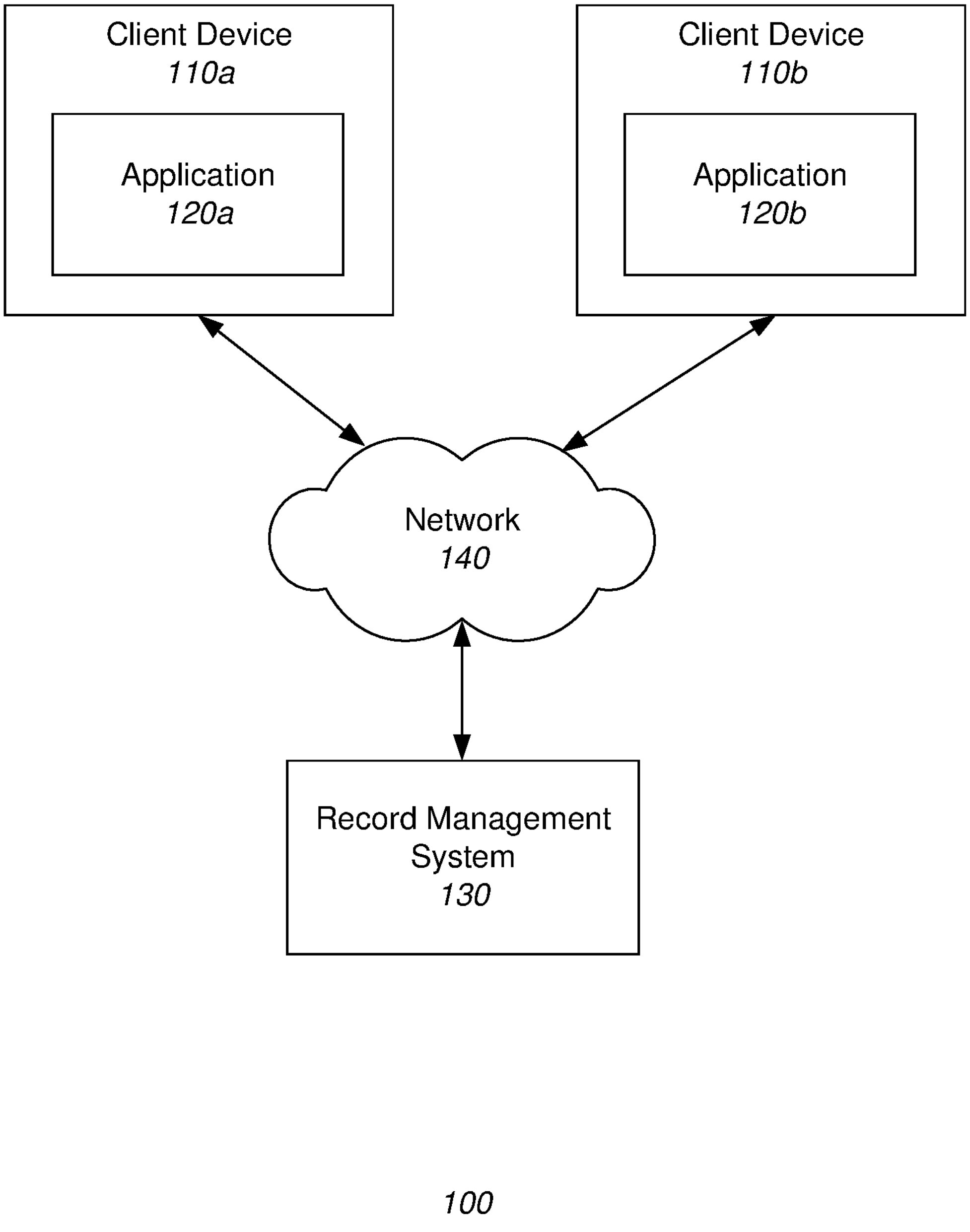
FIG. 1 is a high-level block diagram illustrating an embodiment of an environment for managing accessibility to records for an organization in accordance with an embodiment.

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures.

The figures use like reference numerals to identify like elements. A letter after a reference numeral, such as "102*a*," indicates that the text refers specifically to the element having that particular reference numeral. A reference numeral in the text without a following letter, such as "102," refers to any or all of the elements in the figures bearing that reference numeral.

FIG. 1 is a high-level block diagram illustrating an embodiment of an environment 100 for managing accessibility to records for an organization in accordance with an embodiment. The environment includes one or more client devices 110 connected by a network 140 to a record management system 130. Here only two client devices 110*a*, 110*b* and one record management system 130 are illustrated but there may be multiple instances of each of these entities. For example, there may be thousands or millions of client devices 110 in communication with one or more record management systems 130.

The network 140 provides a communication infrastructure between the client devices 110 and the record management system 130. The network 140 is typically the Internet, but may be any network, including but not limited to a Local Area Network (LAN), a Metropolitan Area Network (MAN), a Wide Area Network (WAN), a mobile wired or wireless network, a private network, or a virtual private network. Portions of the network 140 may be provided by links using communications technologies including WiFi based on the IEEE 802.11 standard, the BLUETOOTH short range standard, and the Wireless Universal Serial Bus (USB) standard.

The client devices 110 are computing devices such as smartphones with an operating system such as ANDROID® or APPLE® IOS®, tablet computers, laptop computers, desktop computers, electronic stereos in automobiles or other vehicles, or any other type of network-enabled device on which digital content may be listened to or otherwise experienced. Typical client devices 110 include the hardware and software needed to connect to the network 118 (e.g., via Wifi and/or 4G or other wireless telecommunication standards).

The client device 110 includes an application 120 that allows a user of the client device 110 to interact with the record management system 130. For example, the application 120 could be a browser that allows a user of the client device 110 to interact with the record management system 130 by browsing a web site of the record management system 130. As another example, the application 120 could be a dedicated application specifically designed (e.g., by the organization responsible for the record management system 130) to enable interactions with the record management system 130 and its content. In one embodiment, the application 120 is a business management application, such as enterprise resource planning (ERP) application or customer relationship management (CRM) application that allows businesses to manage inventory of sales, client relationships, product planning, workflow, and the like.

Users of client devices 110 are members of organizations, such as businesses, universities, and the like. For example, members may be employees of a business, or students of a university. Typically, the plurality of members are divided into multiple units (e.g., divisions, departments, teams, and the like) differing in size, identity, and function within the organization. For example, a clothing company may include a business unit "West Coast Sales" that consists of sales representatives in charge of selling products in the West coast, and a business unit "East Coast Sales" that consists of sales representatives in charge of selling products in the East coast. As another example, the population of a university may be divided into "students," "faculty," and "staff," according to the identity of the members within the university.

In some organizations, the members are ranked according to a hierarchy defined for the organization. The hierarchy assigns different amounts of authority to members of different ranks. For example, a rank of a manager that oversees the business unit "West Coast Sales," may be higher than that of the members that are part of the unit, but the same as another manager that oversees the business unit "East Coast Sales." As another example, a company executive officer (CEO) may have the highest rank in a business organization and oversee all business units and employees of the company.

The application 120 of a client device 110 allows members of an organization to store electronic records and retrieve records from the record management system 130. The electronic records contain information stored by members of the organization for various purposes. Although some records contain content that can be accessed by all members of the organization, some records contain content that representatives of the organization or the owners of the records intend to be shared and accessed by a limited audience. For example, a hospital may want to restrict access to medical records for patients to only the doctors of the hospital, but not to any other hospital employee. As another example, a business may want to restrict access to records generated by a supervisory member of a department to only those that are part of the department.

To address this issue, application 120 also allows members to retrieve records from the record management system 130 that are accessible by the members. Specifically, members can generate records and share access to records with other selected members within the organization through the application 120. In one embodiment, the application 120 also allows members of the organization to submit search queries to the record management system 130. In return for a query submitted by a member, the member receives a list of electronic records that are relevant to the search query and that are determined to be accessible by the member.

The record management system 130 stores records and manages accessibility to records for an organization. Specifically, the record management system 130 not only allows members to create and store records in the system 130, but also tracks which members of the organization have access to which records. Thus, when a member requests to access a record through the application 120 on the client device

110, the record management system 130 provides the record to the member if the member has permission to access the record.

In one embodiment, the record management system 130 processes search queries provided by members of an organization. When the record management system 130 receives a search query from a member provided through a client device 110, the record management system 130 identifies records associated with the organization that are relevant to the search query. The record management system 130 determines which of the relevant records are accessible by the member and includes relevant records accessible by the member in search results transmitted to the client device 110.

The record management system 130 tracks various ways in which members of an organization can gain access to records. Specifically, a member can gain explicit access to a record if there is a direct association between the individual member and the record. For example, the creator of a record may automatically gain explicit access to the record. As another example, a member may be granted explicit access to a record by another authorized member through the application 120.

A member can also gain implicit access to records through various membership associations within the organization. In one instance, groups of one or more members can commonly share access to records. Thus, although there is no direct association between the record and the members of the group, each member is granted implicit access to the record through membership to the group. In another instance, different groups and members can inherit access to records from one another. For example, a supervisory member of a business unit may inherit access to records that are accessible by the members of the business unit. Thus, although there is no direct association between the record and the supervisory member, the supervisory member is granted implicit access to records accessible by the business unit because the supervisory member inherits access from members of the business unit. As another example, members of the business unit may inherit access to records that are accessible by the supervisory member of the business unit.

To manage accessibility to records, the record management system 130 stores one or more explicit databases containing indications on which records are explicitly accessible by the plurality of members and the plurality of groups, and one or more membership databases containing information on membership associations within the organization that allow members to gain implicit access to records. In one embodiment, the record management system 130 could determine whether a member has access to a record by determining whether the member has explicit access to a record from the explicit databases, or has implicit access to the record by individually tracking membership associations in the membership databases.

However, determining accessibility to records through multiple databases requires a lot of computational resources and takes a significant amount of time. For example, the record management system 130 may be required to determine accessibility for thousands of records responsive to a search query before providing the results of the query back to the client device 110. In such an example, the member of the search query may have to wait a significant amount of time before receiving the results of the query.

Thus, to enhance computational efficiency, the record management system 130 generates a direct mapping between records and members that indicates, for each member, records that are accessible the member (either explicitly or implicitly). This allows accessibility for each member to be determined quickly if needed without the need for tracking membership associations through multiple databases. In one embodiment, the direct mapping is generated by combining the explicit databases and the membership databases through matrix multiplication. A more detailed description of the record management system 130 is provided below in reference to FIG. 3.

Figure 2:
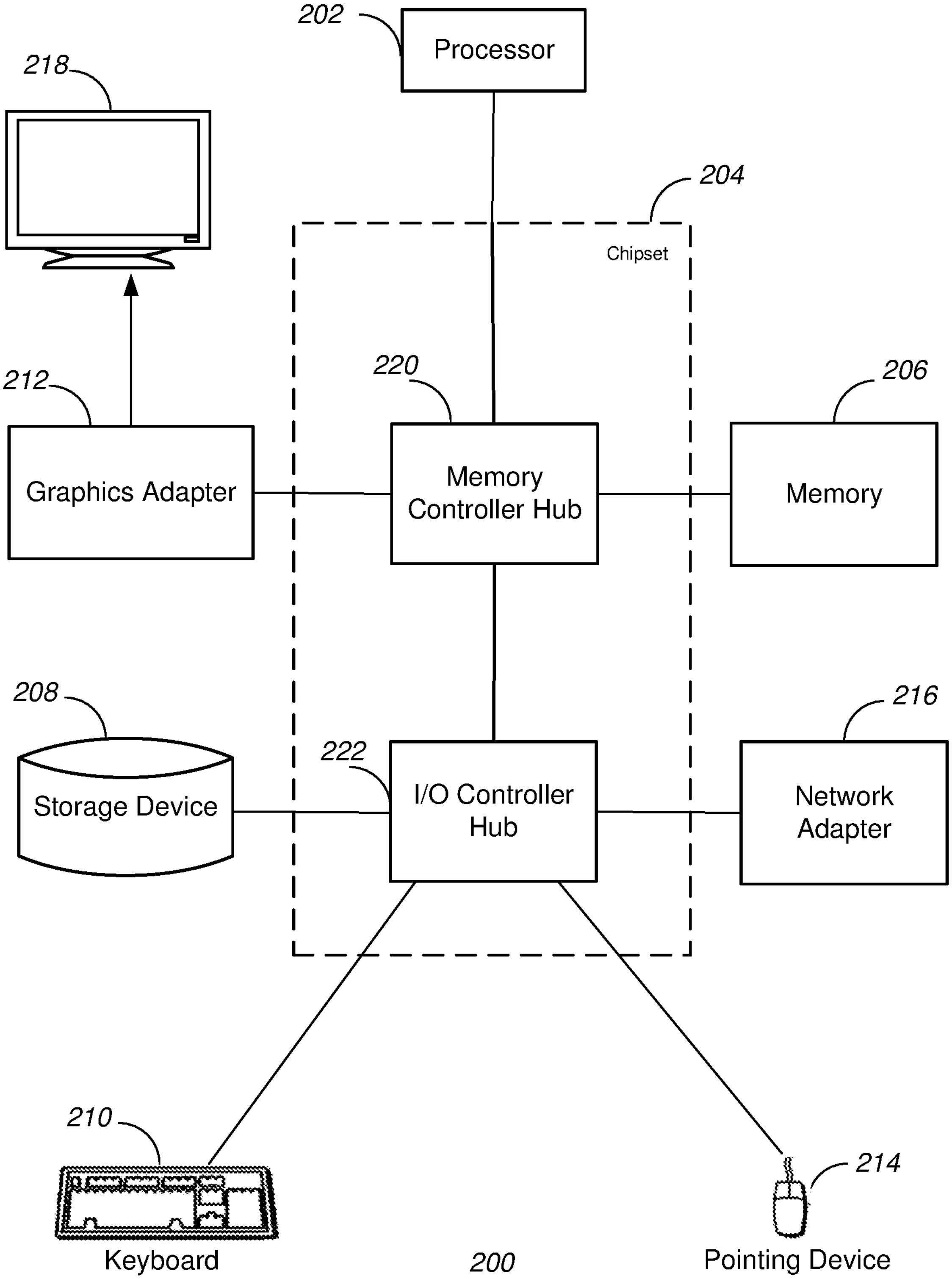
FIG. 2 is a high-level block diagram illustrating an example computer for implementing the entities shown in FIG. 1.

FIG. 2 is a high-level block diagram illustrating an example computer 200 for implementing the client device 110 and/or the record management system 130 of FIG. 1. The computer 200 includes at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display 218 is coupled to the graphics adapter 212. A storage device 208, an input device 214, and network adapter 216 are coupled to the I/O controller hub 222. Other embodiments of the computer 200 have different architectures.

The storage device 208 is a non-transitory computer-readable storage medium such as a hard drive, compact disk read-only memory (CD-ROM), DVD, or a solid-state memory device. The memory 206 holds instructions and data used by the processor 202. The input interface 214 is a touch-screen interface, a mouse, track ball, or other type of pointing device, a keyboard, or some combination thereof, and is used to input data into the computer 200. In some embodiments, the computer 200 may be configured to receive input (e.g., commands) from the input interface 214 via gestures from the user. The graphics adapter 212 displays images and other information on the display 218. The network adapter 216 couples the computer 200 to one or more computer networks.

The computer 200 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 208, loaded into the memory 206, and executed by the processor 202.

The types of computers 200 used by the entities of FIG. 1 can vary depending upon the embodiment and the processing power required by the entity. The computers 200 can lack some of the components described above, such as graphics adapters 212, and displays 218. For example, the records management system 130 can be formed of multiple blade servers communicating through a network such as in a server farm.

Figure 3:
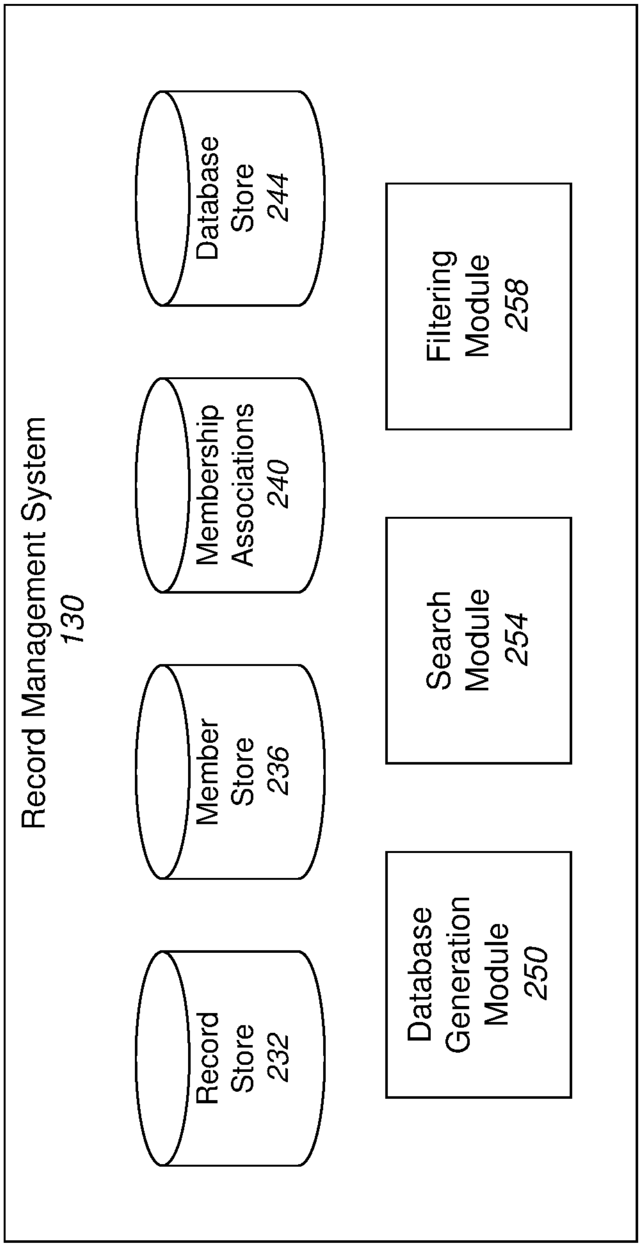
FIG. 3 shows the system architecture of a record management system, in accordance with an embodiment.

FIG. 3 shows the system architecture of the record management system 130, in accordance with an embodiment. The record management system 130 includes a database generation module 250, a search module 254, and a filtering module 258. The record management system 130 also includes a record store 232, a member store 236, membership associations 240, and a database store 244. Some embodiments of the record management system 130 have different and/or additional modules and stores than the ones described here. Similarly, the functions can be distributed among the modules in a different manner than is described here. Certain modules and functions can be incorporated into other modules of the record management system 130.

The record store 232 stores electronic records that are generated by members of an organization. The information included in electronic records may vary. For example, records may be text-based records that contain letters, reports, memos, and e-mail messages. Common formats for text-based records may include Portable Document Format (PDF), Rich Text Format (RTF), textfile (TXT), and Microsoft Word Binary File Format (DOC), and the like. Example records may also be graphics-based records that contain illustrations, photographs, and web-page graphics. Common formats for graphics-based records may include Encapsulated Postscript (EPS), Tagged Image File Format (TIFF), JPEG, Portable Network Graphics (PNG), Graphics Interchange Format (GIF), and the like. Example records may also be audio and video-based records that contain videos, music files, and recorded narratives. Common formats for audio and video-based records may include QuickTime File Format (MOV), Moving Picture Experts Group (MPEG), Windows Media Video (WMV), MPEG-1 and/or MPEG-2 Audio Layer (MP3), and the like. Example records may also be spreadsheet-based records that contain financial analyses and statistical calculations. Common formats for spreadsheet-based records may include Excel Binary File Format (XLS) and the like. However, it is appreciated that electronic records may include any other electronic file of any format that can be stored on a database other than those described here.

The electronic records stored in the record store 232 are selectively accessible to members of the organization, either through explicit access or implicit access gained through various membership associations within the organization. Each electronic record is assigned a record ID and is associated with a set of metadata. The record ID is an identifier unique to an electronic record. An example record ID may be “00100013OeF.” The set of metadata describes various properties of the record and may include fields such as memory size, time and date created, creator, last time edited, format and extension, and the like of the record.

In one embodiment, the record management system 130 additionally flags low-visibility records, which are records that are accessible by less than a threshold number of members in the organization. The low-visibility records may be identified based on the direct mapping between records and members having access to the records. As described herein, a threshold number may be, for example, a specific number or a percentage. For example, the record management system 130 may flag records that are accessible by less than 1000 members within the organization, or may flag records that are accessible by less than 20% of the members within the organization.

The member store 236 contains information on members of the organization. Each member in the member store 236 is assigned a member ID and is associated with a set of metadata. The member ID is an identifier unique to a member. An example member ID may be “0050001vOAm.” The set of metadata describes various information of the member and may include fields such as name, age, birthdate, which unit or groups of the organization the member is affiliated with, and rank and role of the member in the organization hierarchy, and the like.

In one embodiment, the record management system 130 additionally flags low-visibility members, which are members of the organization that have access to less than a threshold number of records in the organization. The low-visibility members may be identified based on the direct mapping between records and members having access to the records. For example, the record management system 130 may flag members that have access to less than 500 records, or may flag members that have access to less than 5% of the records in the record store. In one embodiment, the record management system 130 additionally flags low-association members, which are members that have less than a threshold number of membership associations within the organization that can lead to implicit access to records. For example, the record management system 130 may flag members that have less than 200 membership associations that potentially grant the members implicit access to records. In one embodiment, the record management system 130 flags low-visibility members according to the type of record. By flagging low-visibility members based on the type of record, the record management system 130 can improve efficiency when executing search queries for specific types of records.

The membership associations 240 store relationships between members of the organization that allow members to share access to records among each other. The membership associations 240 also indicate member affiliations with a plurality of groups defined for the organization. Each group in the plurality of groups is composed of one or more members of the organization, and may coincide with the various units of the organization, but may also differ if necessary. In one embodiment, a group may be nested in another group (“parent group”). For example, the group “California Sales” may be nested within the parent group “West Coast Sales.”

A group as a single entity is allowed to gain access to records. In one embodiment, the constituents of the group gain implicit access to records that the group has access to. In such a manner, groups provide a convenient way of managing accessibility to records, as members of departments, teams, and other units are grouped together for common functions or purposes within the organization, and thus, are more likely to share access to the same records. In one embodiment, groups are also allowed to form direct associations with records and gain explicit access to the associated records. For example, an administrator of a group may create and store records for the group, or an authorized member may grant the group explicit access to records.

The membership associations 240 also include access connections between members and groups that allow access to be inherited between connected members and groups. The access connections may reflect the hierarchy of the organization, but may also differ if necessary. In one instance, access connections include member-to-group access connections in which a group inherits access to records from an individual member. For example, members affiliated with a group managed by a supervisory member may inherit access to records that are accessible by the supervisory member through a member-to-group access connection between the supervisory member and the group. In another instance, access connections include group-to-member access connections in which a member inherits access to records from a group. For example, the supervisory member may inherit access to records that are accessible by the members of the managed group through a group-to-member access connection between the supervisory member and the group.

In another instance, access connections include group-to-group access connections in which a group inherits access to records from another group. For example, members affiliated with a group nested in a parent group may inherit access to records that are accessible by the parent group through a group-to-group access connection between the parent group and the nested group. As another example, a group in a higher rank in the organization may inherit access to records that are accessible by a group in a lower rank of the organization through a group-to-group access connection between the higher-ranked group and the lower-ranked group.

Access connections may be manually established by members of the organization, or automatically established according to a record access policy for the organization. For example, a member (e.g., supervisory member) may indicate through the application 120 that his or her access to records can be inherited by selected groups (e.g., groups managed by the supervisory member) defined for the organization. As a different example, a parent group's access to records may automatically be inherited by groups nested within the parent group according to a record access policy established by the organization.

Although access connections are described in reference to member-to-group, group-to-member, and group-to-group access connections, it is appreciated that in other instances, other forms of access connections can be established between members and groups of the organization. For example, member-to-member access connections may be established between individual members of the organization.

In one embodiment, in the environment of FIG. 1, an individual member of an organization may gain access to a record by at least one of the following ways: i) explicit access to the record (explicit access), ii) member of a group having explicit access to the record (implicit access through group membership), iii) member of a group that inherit access to the record from another member (implicit access through member-to-group access connections), and iv) member of a group that inherited access to the record from another group (implicit access thorough group-to-group access connections).

The database store 244 contains one or more databases that the record management system 130 uses to manage accessibility to records. In one embodiment, each database in the database store 244 is a matrix of elements that includes one or more rows and one or more columns. Each element is positioned at an intersection of a row and column. In one particular embodiment referred throughout this application, each element of a matrix is a Boolean variable having one of two values corresponding to a logical TRUE or a logical FALSE. In such an embodiment, the value "1" denotes a logical TRUE, and the value "0" denotes a logical FALSE. The Boolean variables follow the following rules for Boolean Algebra:

$$0\times0=0,\ 0\times1=0,\ 1\times0=0,\ 1\times1=1$$

$$0+0=0,\ 0+1=1,\ 1+0=1,\ 1+1=1.$$

The record management system 130 stores an explicit database indicating for each record in the record store 232 which records members and groups within the organization have explicit access to the record. In one embodiment, the explicit database is a matrix AS (Account Sharing) of size R×(U+G), in which AS(r,j)=1 if record r=1, 2, . . . , R is explicitly accessible to member j=1, 2, . . . , U or group j=U+1, U+2, . . . , U+G, where R is the number of records, U is the number of members of the organization, and G is the number of groups of the organization. In other words, member/group j has explicit access to record r if equation (1), given by:

$$AS(r,j) \tag{1}$$

is equal to 1, and does not if equation (1) is equal to 0.

FIG. 4A is an example of the AS matrix, according to an embodiment. As shown in FIG. 4A, the organization contains 4 records (denoted by "R1" through "R4"), 3 members (denoted by "M1" through "M3"), and 1 group (denoted by "G1"). Hence, the AS matrix in this example is a 4×4 matrix. Further, in this example, member M1 has explicit access to record R1 as indicated by the "1" value at the intersection of R1 and M1, members M2, M3 have explicit access to record R2 as indicated by the "1" value at the intersection of R2 and M2 and the "1" value at the intersection of R2 and M3, group G1 has explicit access to record R3 as indicated by the "1" value at the intersection of R3 and G1, and member M3 has explicit access to record R4 as indicated by the "1" value at the intersection of R4 and M3.

The record management system 130 stores one or more membership databases containing information on membership associations 240 within the organization that can lead to members having implicit access to records. In one embodiment, a membership database is a DGM (Direct Group Membership) matrix indicating memberships of individual members in the plurality of groups. In one embodiment, the DGM matrix is of size (U+G)×U, in which DGM(i,j)=1 if group i=U+1, U+2, . . . , U+G contains member j=1, 2, . . . , U (portion "$D_{gu}$"), and DGM(i,i)=1 for i=1, 2, . . . , U (portion "$I_u$"). Thus, member j=1, 2, . . . , U gains implicit access to record r if member j is a member of any group k=U+1, U+2, . . . , U+G having explicit access to record r. In other words, member j gains group membership access to record r if equation (2), given by:

$$\sum_{k=U+1}^{U+G} AS(r,k)\cdot DGM(k,j) \tag{2}$$

is equal to 1, and does not if equation (2) is equal to 0.

FIG. 4B is an example of the DGM matrix, according to an embodiment. As shown in FIG. 4B, members M2, M3 are constituents of group G1 because the intersection of G1 and M2 has a value of "1," and the intersection of G1 and M3 has a value of "1". In addition, the diagonal elements for members M1, M2, M3 are turned on, according to the definition of the DGM database.

In one embodiment, another membership database stored by the database store 244 is a GB (Group Blowout) matrix that indicates access connections between members and groups of the organization according to the membership associations 240. In one embodiment, the GB matrix is of size (U+G)×(U+G), in which GB(i,j)=1 if group j=U+1, U+2, . . . , U+G inherits access from user i=1, 2, . . . , U (member-to-group access connections, portion "$G_{ug}$") or group i=U+1, U+2, . . . , U+G (group-to-group access connections, portion "$G_{gg}$"), and GB(i,i)=1 for i=1, 2, . . . , U+G. Thus, member j=1, 2, . . . , U gains implicit access to record r if member j is a member of any group k=U+1, U+2, . . . , U+G that inherits access from any member m=1, 2, . . . , U having explicit access to record r.

In other words, member j gains implicit access to record r through member-to-group access connections if equation (3), given by:

$$\sum_{m=1}^{U}\sum_{k=U+1}^{U+G} AS(r,k)\cdot GB(m,k)\cdot DGM(k,j) \tag{3}$$

is equal to 1, and does not if equation (3) is equal to 0. Moreover, member j=1, 2, . . . , U gains implicit access to record r if member j is a member of any group k=U+1, U+2, . . . , U+G that inherits access from any group m=U+1, U+2, . . . , U+G having explicit access to record r. In other words, member j gains implicit access to record r through group-to-group access connections if equation (4), given by:

$$\sum_{m=U+1}^{U+G}\sum_{k=U+1}^{U+G} AS(r,k)\cdot GB(m,k)\cdot DGM(k,j) \tag{4}$$

is equal to 1, and does not if equation (4) is equal to 0.

Figure 4C:
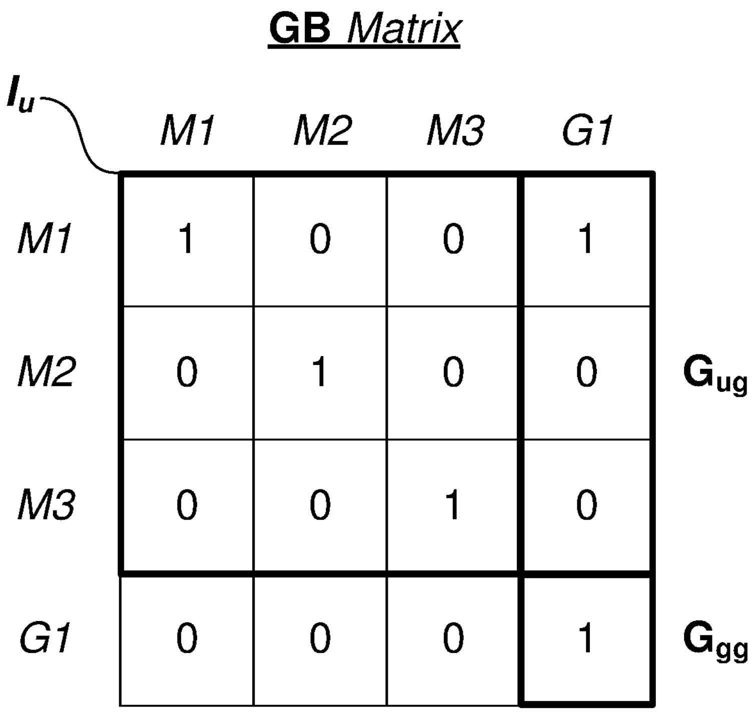
FIG. 4C is an example access connection database GB, in accordance with an embodiment.

FIG. 4C is an example of the GB matrix according to an embodiment. As shown in FIG. 4C by the "1" value at the intersection of M1 and G1, an access connection is established between member M1 and group G1. As a result, group G1 inherits access to records that are accessible by member M1. In addition, the diagonal elements for members M1, M2, M3, and group G1 are turned on, according to the definition of the GB database.

Returning to FIG. 3, the database generation module 250 combines the explicit database and membership databases in the database store to generate accessibility database F. The database generation module 250 stores the database F in the database store 244 for use by the modules. Database F indicates records that are explicitly or implicitly accessible by each member of the organization. In contrast to the explicit databases and membership databases that track access to records through a plurality of groups and access connections, the accessibility database F tracks access to records through a direct mapping between the records and members of the organization.

In one embodiment, the accessibility database F is a matrix and the database generation module 250 generates the accessibility matrix F by matrix multiplying the AS, GB, DGM matrices, such that F=AS×GB×DGM. The resulting accessibility matrix F is of size R×U, in which F(r,j)=1 if record r is explicitly or implicitly accessible by member j=1, 2, . . . , U. Due to the definition of matrix multiplication, each element in the accessibility matrix F(r,j) is given by:

$$F(r,k) = \sum_{m=1}^{U+G}\sum_{k=1}^{U+G} AS(r,k)\cdot GB(m,k)\cdot DGM(k,j). \tag{5}$$

The accessibility matrix F has the property that F(r,j) equals to 1 if any of equations (1) through (4) are equal to 1 for member j in regards to record r, and F(r,j) equals to 0 if all of equations (1) through (4) are equal to 0. In other words, element F(r,j) equals to 1 if member j has explicit or implicit access to record r through the 4 routes described above, and equals to 0 otherwise.

Specifically, equation (1) can be re-written as:

$$AS(r,k) \Longleftrightarrow \sum_{m=1}^{U+G}\sum_{k=1}^{U} AS(r,k)\cdot GB(m,k)\cdot DGM(k,j), \tag{6}$$

because:

$$AS(r,j)=0 \Longleftrightarrow \sum_{m=1}^{U+G}\sum_{k=1}^{U} AS(r,m)\cdot GB(m,k)\cdot DGM(k,j)=0$$

$$\therefore DGM(k,j)=0,\ GB(k,j)=0 \text{ for } k\neq j, \text{ and}$$

$$GB(k,j)=0 \text{ for } j\in U+1, U+2, \ldots, U+G,\ k\in 1,2,\ldots,U$$

and $$AS(r,j)=1 \Longleftrightarrow \sum_{m=1}^{U+G}\sum_{k=1}^{U} AS(r,m)\cdot GB(m,k)\cdot DGM(k,j)=1$$

$$\therefore \text{at least } DGM(j,j)=0,\ GB(j,j)=1 \text{ for } j\in 1,2,\ldots,U.$$

Moreover, equation (2) can be re-written as:

$$\sum_{k=U+1}^{U+G} AS(r,k)\cdot DGM(k,j) \Longleftrightarrow \sum_{k=U+1}^{U+G} AS(r,k)\cdot GB(k,k)\cdot DGM(k,j) \tag{7}$$

because:

$$\sum_{k=U+1}^{U+G} AS(r,k)\cdot DGM(k,j)=0 \Longleftrightarrow \sum_{k=U+1}^{U+G} AS(r,k)\cdot GB(k,k)\cdot DGM(k,j)=0$$

and $$\sum_{k=U+1}^{U+G} AS(r,k)\cdot DGM(k,j)=1 \Longleftrightarrow \sum_{k=U+1}^{U+G} AS(r,k)\cdot GB(k,k)\cdot DGM(k,j)=1$$

$$\therefore \text{at least } GB(k,k)=1 \text{ for } k\in U+1, U+2, \ldots, U+G.$$

Thus, equations (6), (7), (3), and (4) can be combined into the following equation:

$$\sum_{m=1}^{U+G}\sum_{k=1}^{U+G} AS(r,k)\cdot GB(m,k)\cdot DGM(k,j), \tag{8}$$

which is identical to that of element F(r,j) in the accessibility matrix F generated by matrix multiplication of the AS, GB, and DGM matrices. Thus, it can be seen that each element F(i,j) of the accessibility matrix F is equal to 1 if any of equations (1) through (4) are equal to 1 for member j in regards to record r, and is equal to 0 if all of equations (1) through (4) are equal to 0. The accessibility matrix F is also stored in the database store 244.

Figure 5:
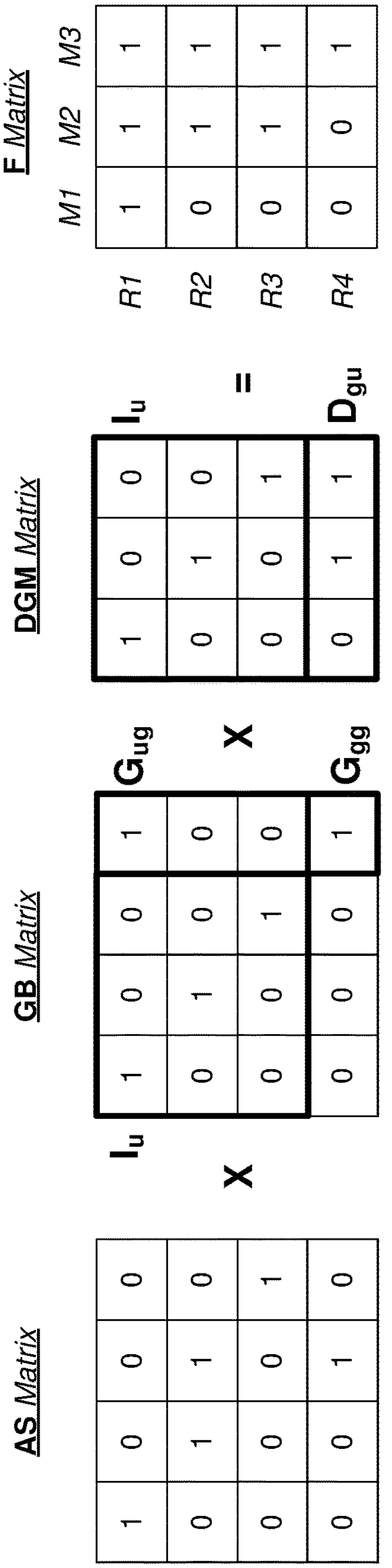
FIG. 5 is an example accessibility database F, in accordance with an embodiment.

FIG. 5 is an example accessibility matrix F generated by matrix multiplication of the matrices AS, GB, and DGM of FIGS. 4A, 4B, and 4C. As shown by the F matrix of FIG. 5, record R1 is accessible by members M1, M2, and M3. Member M1 has access to record R1 at least as a result of the AS matrix of FIG. 4A indicating that member M1 has explicit access. Further, group G1 inherits access to records from member M1 as indicated by the GB matrix of FIG. 4C, and since the DGM matrix of FIG. 4B indicates that members M2 and M3 are part of group G1, the F matrix indicates that record R1 is accessible by members M2 and M3. The F matrix also indicates that record R2 is accessible by members M2 and M3 and that record R4 is accessible by member M3 at least as a result of the explicit access indicated by the AS matrix. The F matrix also indicates that record R3 is accessible by members M2 and M3. Group G1 has explicit access to record R3 as a result of the AS matrix of FIG. 4A, and since the DGM matrix of FIG. 4B indicates that members M2 and M3 are part of group G1, the F matrix indicates that record R3 is accessible by members M2 and M3.

In one embodiment, the database generation module 250 also combines the membership databases GB and DGM into a single database MEM through matrix multiplication, such that MEM=GB×DGM. The resulting MEM matrix is of size (U+G)×U. Due to the definition of matrix multiplication, each element in the database MEM(m,j) is given by:

$$MEM(m,j) = \sum_{k=1}^{U+G} GB(m,k)\cdot DGM(k,j). \tag{9}$$

In terms of $I_u$, $G_{ug}$, $D_{gu}$, and $G_{gg}$, MEM can be written as.

$$MEM = \begin{bmatrix} I_u + G_{ug} \times D_{gu} \\ G_{gg} \times D_{gu} \end{bmatrix}. \tag{10}$$

Moreover, equation (10) can be re-written as:

$$MEM = \begin{bmatrix} I_u + G_{ug} \times D_{gu} \\ D_{gu} + G_{gg} \times D_{gu} \end{bmatrix} \tag{11}$$

because for each element in $G_{gg} \times D_{gu}$, in which m=1, 2, . . . , G and j=1, 2, . . . , U:

$$(G_{gg} \times D_{gu})(m, j) = \sum_{k=U+1}^{U+G} GB(U+m, k) \cdot DGM(k, j) = 0 \Longleftrightarrow (D_{gu} + G_{gg} \times D_{gu})(m, j) = GB(U+m, j) + \sum_{k=U+1}^{U+G} GB(U+m, k) \cdot DGM(k, j) = 0$$

$$\therefore DGM(U+m, j) = 0 \text{ since } GB(k, k) = 1 \text{ for } k \in U+1, U+2, \ldots, U+G. \text{ and}$$

$$(G_{gg} \times D_{gu})(m, j) = \sum_{k=U+1}^{U+G} GB(U+m, k) \cdot DGM(k, j) = 1 \Longleftrightarrow (D_{gu} + G_{gg} \times D_{gu})(m, j) = GB(U+m, j) + \sum_{k=U+1}^{U+G} GB(U+m, k) \cdot DGM(k, j) = 1.$$

Thus, the accessibility database F can also be written as:

$$F = AS \times MEM = AS \times \begin{bmatrix} I_u + G_{ug} \times D_{gu} \\ D_{gu} + G_{gg} \times D_{gu} \end{bmatrix}. \tag{11}$$

As shown in equation (11), it can be seen that the accessibility database F tracks explicit access to records from factor $I_u$, implicit access to records through group membership from factor $D_{gu}$, implicit access to records through member-to-group access connections from factor $G_{ug} \times D_{gu}$, and implicit access to records through group-to-group access connections from factor $G_{gg} \times D_{gu}$. Thus, the membership database MEM represents the various membership associations that allow members of the organization to gain implicit access to records. The database MEM is also stored in database store 244.

Figure 6:
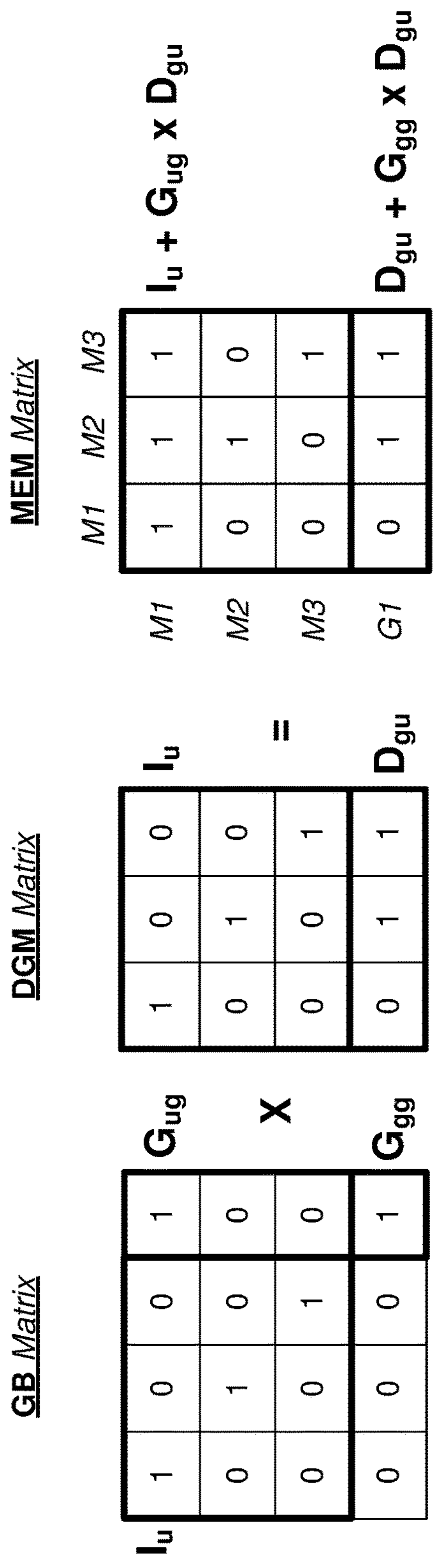
FIG. 6 is an example membership database MEM, in accordance with an embodiment.

FIG. 6 is an example membership matrix MEM generated by the database generation module 250 by matrix multiplication of the matrices GB, and DGM of FIGS. 4B and 4C. As shown in FIG. 6, as a result of the matrix multiplication, the MEM matrix consists of a portion that is the sum of $I_u$ and $G_{ug} \times D_{gu}$, and another portion that is the sum of $D_g$ and $G_{gg} \times D_{gu}$. As shown in the first column, member M1 has no membership associations from which member M1 can gain implicit access to records. On the other hand, members M2 and M3 gain implicit access to records explicitly accessible by group G1 since both members M2 and M3 are part of group G1 (arising from matrix $D_{gu}$). In addition, members M2 and M3 gain implicit access to records accessible by member M1, since a member-to-group access connection exists between member M1 and group G1 (arising from matrix $G_{ug} \times D_{gu}$).

In one embodiment, the database generation module 250 identifies low-visibility members having access to less than a threshold number of records based on the accessibility database F, and flags such members in the member store 236. In another embodiment, the database generation module 250 identifies low-association members having less than a threshold number of membership associations based on the membership database MEM, and flags such members in the member store 236. In yet another embodiment, the database generation module 250 identifies records accessible by less than a threshold number of members based on the accessibility database F, and flags such records in the record store 232.

In one embodiment, any of the databases AS, GB, DGM, F, and MEM may be stored in the database store 244 as sparse matrix representation formats. Specifically, storing a database as a sparse matrix representation allows efficient computer memory usage if the database has a significantly low number of non-zero elements. Especially, the explicit database AS may be stored in sparse matrix representation format for improved memory usage efficiency.

Returning to FIG. 3, the search module 254 receives search queries from members and identifies records that are relevant to the search queries. A search query is a string of text entered by a member to identify records in the record store 232 that satisfy various information needs of the member. Search queries may identify records based on the information contained in the content of records. For example, the search module 254 may identify records that contain exact matches to one or more words in the search query in the content of the records. Search queries may also identify records based on the various metadata associated with the records. For example, the search module 254 may identify records that were created within a time window specified in the submitted search query. The list of relevant records identified by the search module 254 in the records store 232 based on a search query is provided to the filtering module 258 for filtering from the list records that are not accessible by the member.

In one embodiment, when a search query is submitted by a member, the search module 254 determines whether the member is a low-visibility member based on the information stored in the member store 236. If a determination is made that the member is a low-visibility member, the search module 254 determines based on the accessibility database F the records accessible by the member. The search module 254 then executes the search query within the records accessible by the low-visibility member. In one embodiment, the search module 254 provides the list of records identified based on the execution of the search to the member's client device 110. Since the execution of the search query was limited to records accessible by the low-visibility member, there is no need for filtering by the filtering module 258.

On the other hand, if it is determined that the member is not a low-visibility member, the search module 254 executes the search query on the records in the record store 232 without limiting the search to records accessible by the member. The search module 254 provides the list of relevant records identified based on the search to the filtering module 258 for filtering out the records that are not accessible by the member.

Performing the search query on records accessible by low-visibility members improves computational efficiency of the search module 254 since the search query is executed on a smaller number of records than the number of records in the record store 232, and no downtime is required for the filtering module 258 to filter out records accessible by low-visibility members. Specifically, significant computational power used to identify relevant records in the record store 232 that are likely not accessible by low-visibility members when the search query is executed outside records accessible by low-visibility members may be conserved. Moreover, when the search module 254 can return only a predetermined number of records for a given search query, performing the search query on records accessible by low-visibility members guarantees that relevant records accessible by low-visibility members will not be truncated from the predetermined number of records, and low-visibility members will have access to all records identified as relevant by the search query.

In another embodiment, when a search query from a low-association member is submitted, the search module 254 determines whether the member is a low-association member based on the information stored in the member store 236. As described above, a low-association member has less than a threshold number of membership associations that grant the member implicit access to records. If a determination is made that the member is a low-association member, the search module 254 determines based on the accessibility database F the records accessible by the member. The search module 254 then executes the search query within the records accessible by the low-association member. In one embodiment, the search module 254 provides the list of records identified based on the execution of the search to the member's client device 110. Similarly to low-visibility members, since the execution of the search query was limited to records accessible by low-association members, there is no need for filtering by the filtering module 258.

Performing the search query on records accessible by low-association members improves computational efficiency of the search module 254 since the search query is executed on a smaller number of records than the number of records in the record store 232, and no downtime is required for the filtering module 258 to filter out records accessible by low-association members. Specifically, significant computational power used to identify relevant records in the record store 232 that are likely not accessible by low-association members when the search query is executed outside records accessible by low-association members may be conserved. Moreover, similarly to performing search queries for low-visibility members, when the search module 254 can return only a predetermined number of records for a given search query, performing the search query on records accessible by low-association members guarantees that relevant records accessible by low-association members will not be truncated from the predetermined number of records, and low-association members will have access to all records identified as relevant by the search query.

In another embodiment, when a search query from a member is submitted, the search module 254 determines which low-visibility records the member has access to based on the information stored in the record store 236. As discussed above, low-visibility records are records that are accessible by less than a threshold number of members. The search module 254 executes the search query within the low-visibility records accessible by the member and the remaining records in the record store 232. The identified list of relevant records is filtered by the filtering module to determine a list of relevant records that are accessible by the member. In one embodiment, the search module 254 provides the list of records identified based on the execution of the search to the member's client device 110.

Performing the search query on low-visibility records accessible by the member in addition to the remaining records improves computational efficiency of the search module 254 since the search query is executed on a smaller number of records than the number of records in the record store 232, and the downtime required for the filtering module 258 to filter out relevant records accessible by the member is reduced. Specifically, significant computation power used to identify relevant records among low-visibility records in the record store 232 that are likely not accessible by members of the organization when the search query is executed outside low-visibility records may be conserved.

The filtering module 258 receives relevant records identified for search queries, and determines accessibility to the records based on the one or more databases stored in the database store 244. Specifically, the filtering module 258 receives the list of relevant records identified by the search module 254, and determines accessibility to each of the records for the member associated with the search query. The filtering module 258 provides the list of records that are accessible by the member to the client device 110, such that the member can retrieve the records through the application 120.

The filtering module 258 may determine accessibility to records by tracking the various routes through which a member associated with a search query may gain access to records via multiple databases. For example, when the member does not have explicit access to a record, the filtering module 258 may identify whether the member has implicit access to the record by tracking group memberships through the DGM database and determining whether the groups inherit access from other members and groups through the GB database. However, tracking access to records through multiple databases is a computationally inefficient process, especially for a large number of records. Moreover, a significant amount of time may be required before members can retrieve results of search queries due to the computational inefficiency.

Thus, in one embodiment, the filtering module 258 determines accessibility to records based on the accessibility database F. Since both explicit and implicit access to records is combined in a single database, the filtering module 258 can quickly determine accessibility to records by looking up the value of the element corresponding to the member and the record. For example, given a list of relevant records identified for a search query associated with member j, the filtering module 258 may identify the corresponding column $F(\bullet,j)$ in the accessibility database F and determine whether each of the records r is accessible by identifying the value of the element $F(r,j)$ in the corresponding row r.

In another embodiment, the filtering module 258 (and the search module 254) determines accessibility on a per-member basis by extracting the column $MEM(\bullet,j)$ corresponding to the member j associated with the search query, and matrix multiplying the explicit database AS with the extracted column $MEM(\bullet,j)$ as $AS \times MEM(\bullet,j)$. The resulting database is a single column identical to the corresponding column $F(\bullet,j)$ in the accessibility database F.

Determining accessibility on such a per-member basis is advantageous, among other reasons, when storing the explicit database AS and membership database MEM separately achieves greater efficiency for computer memory than storing the accessibility database F itself. For example, when the number of records is significantly higher than the number of members ($R >> U$), storing the explicit database AS in sparse representation form, and storing the membership database MEM separately may achieve greater efficiency for computer memory than storing the R×U-sized accessibility database F itself.

Figure 7:
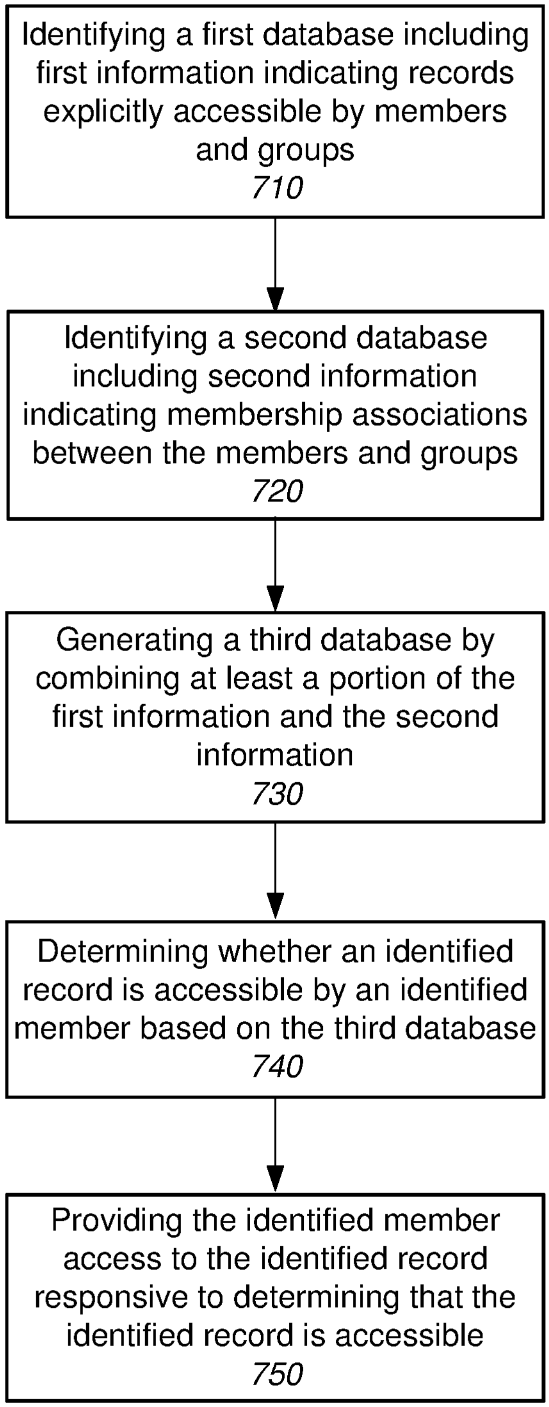
FIG. 7 is a flowchart illustrating a method of managing accessibility to records, in accordance with an embodiment.

FIG. 7 is a flowchart illustrating a method of managing accessibility to records, in accordance with an embodiment. The system identifies 710 a first database that include first information indicating records explicitly accessible by each member from a plurality of members and records explicitly accessible by each group from a plurality of groups within an organization. The system also identifies 720 one or more second databases that include second information indicating membership associations between the plurality of members and the plurality of groups.

The system generates 730 a third database by combining at least a portion of the first information and the second information. The third database indicates, for at least an identified member, records that are accessible by the identified member (explicitly or implicitly). The system determines 740 whether an identified record is accessible by the identified member based on the third database. The system provides 750 access to the identified record responsive to determining that the identified record is accessible by the identified member.

Figure 8:
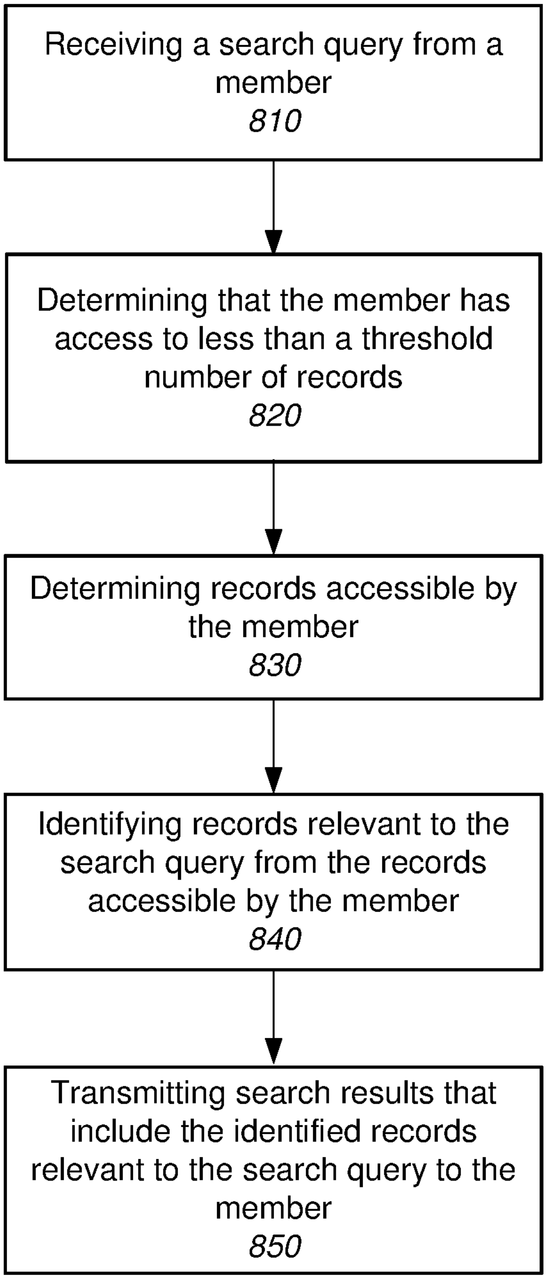
FIG. 8 is a flowchart illustrating a method of managing accessibility to records, in accordance with another embodiment.

FIG. 8 is a flowchart illustrating a method of managing accessibility to records, in accordance with another embodiment. The system receives 810 a search query from a client device associated with a member of an organization. The system determines 820 that the member has access to less than a threshold number of records from a plurality of records. Responsive to determining that the member has access to less than the threshold number of records, the system determines 830 records accessible by the member based on a database that indicates records that are accessible by the identified member (explicitly or implicitly).

The system then identifies 840 records that are relevant to the search query from the records determined to be accessible by the member. Search results that include the identified records relevant to the search query are transmitted 850 to the client device.

Figure 9:
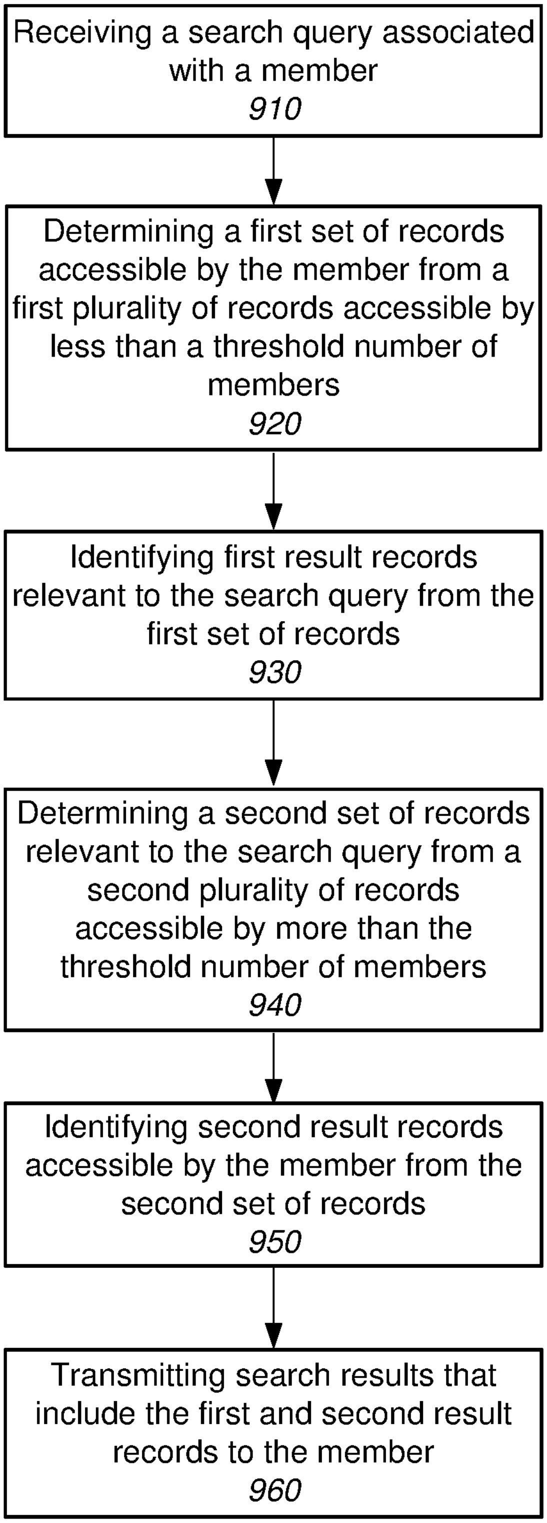
FIG. 9 is a flowchart illustrating a method of managing accessibility to records, in accordance with another embodiment.

FIG. 9 is a flowchart illustrating a method of managing accessibility to records, in accordance with another embodiment. The system receives 910 a search query from a client device associated with a member of an organization. The system determines 920, from a first plurality of records, a first set of records accessible by the member based on a database that indicates records that are accessible by the identified member (explicitly or implicitly). Each of the first plurality of records is accessible by less than a threshold number of members. The system identifies 930 first result records relevant to the search query from the first set of records.

The system determines 940 a second set of records relevant to the search query from a second plurality of records. Each of the second plurality of records are accessible by more than the threshold number of members. The system then identifies 950 second result records accessible by the member from the second set of records. Search results that include the first result records and the second result records are transmitted 960 to the client device.

Those of skill in the art will recognize that other embodiments can perform the steps of FIGS. 7-9 in different orders. Moreover, other embodiments can include different and/or additional steps than the ones described herein.

The invention claimed is:

1. A computer implemented method for processing search queries, the method comprising:

receiving, by a computer system, a search query from a client device associated with a member;

determining, by the computer system, a first set of records accessible by the member from a first plurality of records, each of the first plurality of records accessible by less than a threshold number of members;

identifying, by the computer system, first result records relevant to the search query from the first set of records;

determining, by the computer system, a second set of records relevant to the search query from a second plurality of records, each of the second plurality of records accessible by more than the threshold number of members;

identifying, by the computer system, second result records accessible by the member from the second set of records; and transmitting, by the computer system to the client device, search results that include the first result records and the second result records.

2. The computer implemented method of claim 1, further comprising:

identifying, by the computer system, one or more first databases including first information indicating records explicitly accessible by each member from a plurality of members including the member, and records explicitly accessible by each group from a plurality of groups; and identifying, by the computer system, one or more second databases including second information indicating membership associations between the plurality of members and the plurality of groups.

3. The computer implemented method of claim 2, further comprising:

generating a third database by combining at least a portion of the first information and the second information, the third database indicating for at least the member, records explicitly accessible by the member, and records implicitly accessible by the member through the membership associations.

4. The computer implemented method of claim 3, wherein based on the third database the first set of records accessible by the member is determined and the second result records accessible by the member are identified.

5. The computer implemented method of claim 3, wherein the third database is generated by combining the portion of the first information and the second information through matrix multiplication.

6. The computer implemented method of claim 1, wherein determining the first set of records accessible by the member and identifying the second result records accessible by the member is based on an accessibility database that indicates records explicitly accessible by the member and records implicitly accessible by the member.

7. The computer implemented method of claim 1, further comprising:

identifying, by the computer system, one or more first databases including first information indicating records explicitly accessible by each member from a plurality of members including the member, and records explicitly accessible by each group from a plurality of groups;

identifying, by the computer system, one or more second databases including second information indicating membership associations between the plurality of members and the plurality of groups; and combining a portion of the second information corresponding to membership associations for the member with the one or more first databases to determine the first set of records accessible by the member and to identify the second result records accessible by the member.

8. A non-transitory computer readable storage medium storing instructions that when executed by a computer processor cause the computer processor to perform steps comprising:

receiving, by a computer system, a search query from a client device associated with a member;

determining, by the computer system, a first set of records accessible by the member from a first plurality of records, each of the first plurality of records accessible by less than a threshold number of members;

identifying, by the computer system, first result records relevant to the search query from the first set of records;

determining, by the computer system, a second set of records relevant to the search query from a second plurality of records, each of the second plurality of records accessible by more than the threshold number of members;

identifying, by the computer system, second result records accessible by the member from the second set of records; and transmitting, by the computer system to the client device, search results that include the first result records and the second result records.

9. The non-transitory computer readable storage medium of claim 8, wherein the instructions further cause the computer processor to perform steps comprising:

identifying, by the computer system, one or more first databases including first information indicating records explicitly accessible by each member from a plurality of members including the member, and records explicitly accessible by each group from a plurality of groups; and identifying, by the computer system, one or more second databases including second information indicating membership associations between the plurality of members and the plurality of groups.

10. The non-transitory computer readable storage medium of claim 9, wherein the instructions further cause the computer processor to perform steps comprising:

generating a third database by combining at least a portion of the first information and the second information, the third database indicating for at least the member, records explicitly accessible by the member, and records implicitly accessible by the member through the membership associations.

11. The non-transitory computer readable storage medium of claim 10, wherein based on the third database the first set of records accessible by the member is determined and the second result records accessible by the member are identified.

12. The non-transitory computer readable storage medium of claim 10, wherein the third database is generated by combining the portion of the first information and the second information through matrix multiplication.

13. The non-transitory computer readable storage medium of claim 8, wherein determining the first set of records accessible by the member and identifying the second result records accessible by the member is based on an accessibility database that indicates records explicitly accessible by the member and records implicitly accessible by the member.

14. The non-transitory computer readable storage medium of claim 8, wherein the instructions further cause the computer processor to perform steps comprising:

identifying, by the computer system, one or more first databases including first information indicating records explicitly accessible by each member from a plurality of members including the member, and records explicitly accessible by each group from a plurality of groups;

identifying, by the computer system, one or more second databases including second information indicating membership associations between the plurality of members and the plurality of groups; and combining a portion of the second information corresponding to membership associations for the member with the one or more first databases to determine the first set of records accessible by the member and to identify the second result records accessible by the member.

15. A computer system comprising:

a computer processor; and a non-transitory computer readable storage medium storing instructions that when executed by a computer processor cause the computer processor to perform steps comprising:

receiving, by a computer system, a search query from a client device associated with a member;

determining, by the computer system, a first set of records accessible by the member from a first plurality of records, each of the first plurality of records accessible by less than a threshold number of members;

identifying, by the computer system, first result records relevant to the search query from the first set of records;

determining, by the computer system, a second set of records relevant to the search query from a second plurality of records, each of the second plurality of records accessible by more than the threshold number of members;

identifying, by the computer system, second result records accessible by the member from the second set of records; and transmitting, by the computer system to the client device, search results that include the first result records and the second result records.

16. The computer system of claim 15, wherein the instructions further cause the computer processor to perform steps comprising:

identifying, by the computer system, one or more first databases including first information indicating records explicitly accessible by each member from a plurality of members including the member, and records explicitly accessible by each group from a plurality of groups; and identifying, by the computer system, one or more second databases including second information indicating membership associations between the plurality of members and the plurality of groups.

17. The computer system of claim 16, wherein the instructions further cause the computer processor to perform steps comprising:

generating a third database by combining at least a portion of the first information and the second information, the third database indicating for at least the member, records explicitly accessible by the member, and records implicitly accessible by the member through the membership associations.

18. The computer system of claim 17, wherein based on the third database the first set of records accessible by the member is determined and the second result records accessible by the member are identified.

19. The computer system of claim 17, wherein the third database is generated by combining the portion of the first information and the second information through matrix multiplication.

20. The computer system of claim 15, wherein determining the first set of records accessible by the member and identifying the second result records accessible by the member is based on an accessibility database that indicates records explicitly accessible by the member and records implicitly accessible by the member.

* * * * *